United States Patent [19]

Goettker

[11] Patent Number: 4,817,979

[45] Date of Patent: Apr. 4, 1989

[54] TRAILER COUPLER

[75] Inventor: Bernhardt P. Goettker, Escondido, Calif.

[73] Assignee: Unique Functional Products, San Marcos, Calif.

[21] Appl. No.: 153,341

[22] Filed: Feb. 8, 1988

[51] Int. Cl.⁴ ............................................. B60D 1/06
[52] U.S. Cl. ....................................... 280/512; 403/143
[58] Field of Search ............... 280/512, 513, 511, 508, 280/509; 403/143

[56] References Cited

U.S. PATENT DOCUMENTS

| | | | |
|---|---|---|---|
| 2,435,024 | 1/1948 | Wagner | 280/512 |
| 2,459,448 | 1/1949 | Murray | 280/512 |
| 2,732,222 | 1/1956 | Harroun et al. | 280/512 |
| 2,855,222 | 10/1958 | Bolmes et al. | 280/512 |
| 3,049,366 | 8/1962 | Peters | 280/512 |
| 3,153,545 | 10/1964 | Bolmes et al. | 280/512 |
| 3,446,520 | 5/1969 | Gibson | 280/512 |
| 3,567,253 | 3/1971 | De Puydt et al. | 280/512 |
| 3,830,580 | 8/1974 | Slattery et al. | 280/512 X |
| 4,239,252 | 12/1980 | Huetsch et al. | 280/512 X |
| 4,416,467 | 11/1983 | Bradley | 280/512 |

Primary Examiner—John A. Pekar
Attorney, Agent, or Firm—Duane C. Bowen

[57] ABSTRACT

A trailer coupler having a ball-receiving cavity formed by a stationary and a movable ball-gripping member. A movable abutment at the edge of the cavity adapted to be displaced by the ball of a towing vehicle hitch entering the ball-receiving cavity. Before the movable abutment is displaced, it prevents movement of the coupler operating handle to locked position. When the movable abutment is displaced, the operating handle is able to move to locked position and to move the movable ball-gripping member to secure the ball in the ball-receiving cavity. A latch securing the operating handle in locked position until a movable latch piece is moved to unlatched position.

9 Claims, 4 Drawing Sheets

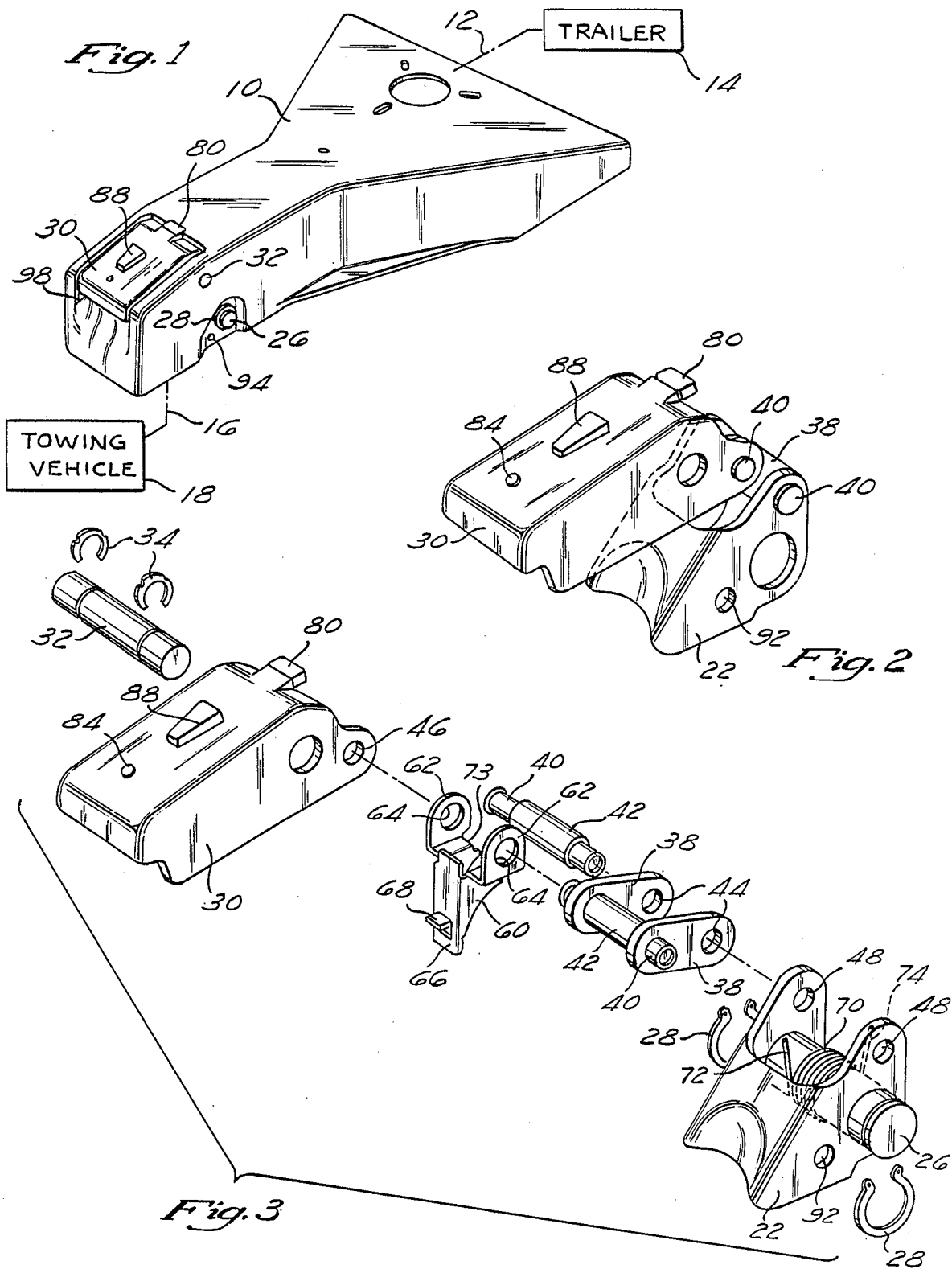

TRAILER COUPLER

BRIEF SUMMARY OF THE INVENTION

Background and Objectives

My invention relates to an improved trailer coupler to connect to a ball on a hitch of a towing vehicle. The mechanism can not move to a position indicating the coupler is locked unless the ball is actually locked by the coupler or unless the presence of the ball is manually simulated.

The numbers of trailers to be towed behind vehicles have greatly increased over the last half century. Over the years, a common type of coupling system that has evolved includes a ball on a hitch on the towing vehicle and a coupler on the trailer with jaws gripping that ball. A common problem that has not been solved before my invention is a false assumption that the ball is locked in place in the coupler when that is not the case.

Objectives of my invention include: generally to solve the above problem and other problems associated with locking a ball in a coupler; to provide a coupler construction that avoids a false assumption that the ball is locked in place in the coupler; to devise a system in which the positioning of the ball in the jaws of the coupler directly displaces an abutment element that otherwise physically prevents movement of the jaws to closed position; and to provide means to latch the operating handle in locked position that requires manual depression of a latch piece to effect release.

My invention will be best understood, together with additional advantages and objectives thereof, when read with reference to the drawings.

DRAWINGS

FIG. 1 is a perspective view of a trailer coupler forming a specific embodiment of my invention. This is a V-tongue type trailer coupler but the invention obviously is equally applicable to couplers connecting to straight tongues and to couplers with a brake actuator interposed between coupler and tongue. The invention is in the ball coupling end of the coupler and the invention is not in the means to attach to a trailer tongue.

FIG. 2 is a perspective view of certain movable parts of the ball coupler.

FIG. 3 is an exploded perspective view of the components viewed in FIG. 2 and associated parts.

SPECIFIC DESCRIPTION

Figure 4:
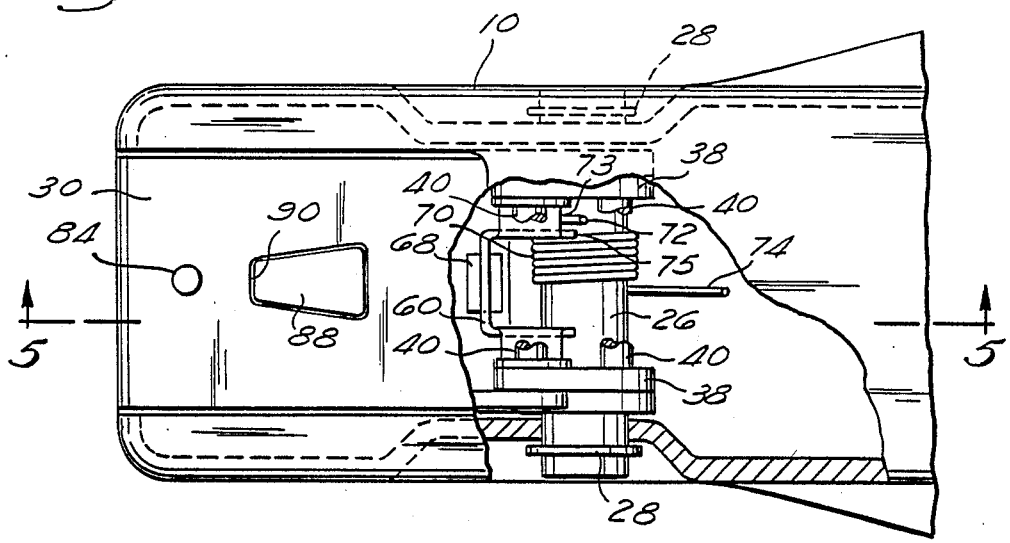
FIG. 4 is a top view with portions broken away.

A coupler 10 is attached to the tongue 12 of a trailer 14 and is attachable to a ball 16 of a hitch of a towing vehicle 18.

The coupler 10 includes a stationary ball-gripping member 20 and a movable ball-gripping member 22. Member 22 is movable between an unlocked position shown in FIGS. 6 and 7 and a locked position shown in FIG. 8. Ball-gripping members 20, 22 are oppositely positioned and define a ball-receiving cavity 24 of a shape and size to generally fit ball 16 in the locked position of movable ball-gripping member 22. Members 20, 22 are disposed to secure ball 16 therebetween in cavity 24 against release in the locked position of movable ball-gripping member 22. Members 20, 22 are disposed to release ball 16 from cavity 24 in the unlocked position of movable ball-gripping member 22.

Stationary ball-gripping member 20 is welded in place to the housing of coupler 10. Movable ball gripping member 22 is mounted on a shaft 26 journaled in openings in the housing of coupler 10 and secured at its ends by snap rings 28. Positions of ball-gripping members 20, 22 form sections of a generally spherical shape to adequately fit, grasp and hold ball 16 which, also, in generally partly spherical in shape.

An operating handle 30 is mounted on a shaft 32 extending through openings in the housing of coupler 10 and is secured with snap rings 34.

A connection is provided between operating handle 30 and movable ball-gripping member 22 by a pair of links 38 set on pins 40 (taking the form of rivets) that extend through openings 44 in links 38 and through openings 46 in operating handle 30 and through openings 48 in movable ball-gripping member 22. A tube sleeve 42 on each pin 40 spaces links 38.

It will be understood that as operating handle 30 is pivoted from unlocked position (FIGS. 6 and 7) to locked position (FIGS. 1 and 8), movable ball-gripping member 22 is pivoted clockwise as viewed and will lock in place any ball 16 positioned in the cavity 24 between ball-gripping members 20, 22. A reverse movement will release ball 16. In moving from unlocked to locked positions, the centers of the shaft 32 and pins 40 move over center (see center-line 56 in FIG. 8), so that the tendency will be for operating handle 30 to stay locked when a force is exerted to try to remove ball 16 from cavity 24. A limit on pivoting of operating handle 30 in a counterclockwise direction as viewed in FIGS. 5-8 are abutting surface 96 on handle 30 and abutting surface 98 on the housing of coupler 10.

I will now describe the instrumentality that, in the foregoing assembly, prevents operating handle 30 from being moved to a supposedly locked position unless a ball 16 is in proper position to be locked in ball-receiving cavity 24. A movable abutment 60 has a pair of ears 62 with openings 64 whereby abutment 60 is pivotally mounted on the sleeve 42 of the pin 40 extending through openings 46 in handle 30. It will be noted in FIG. 6 that the lower end 66 of abutment 60 will not pass movable ball-gripping member 22 in pivoting clockwise as viewed. Further in FIG. 6, a struck-out portion 68 of abutment 60 forms a stop so that operating handle 30 cannot pivot movable ball-gripping member 22 to a locked position because stop 68 will strike an edge of member 22. Movable abutment 60 is held in this position by a spring 70 wound around shaft 26 and having legs 72, 74 bearing on abutment 60 and on part of the housing of coupler 10 respectively.

Figure 6:
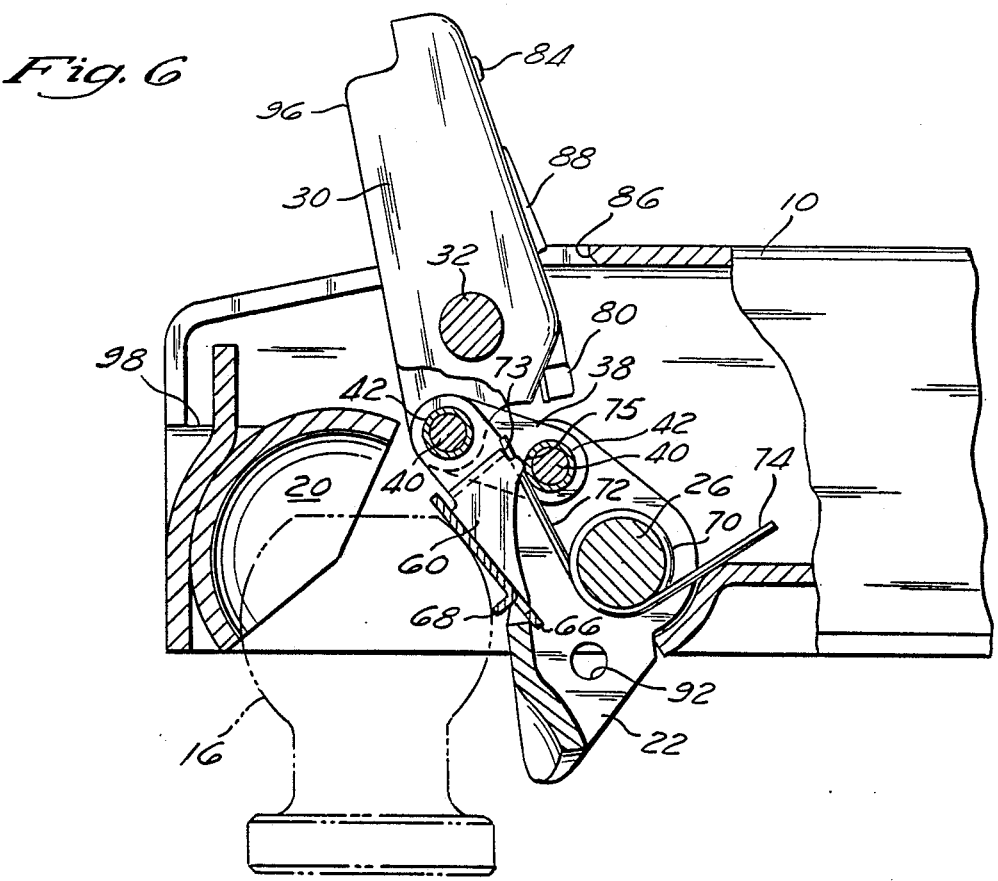
FIG. 6 is a side view, partly in section, showing the operating handle in open position. A ball on a vehicle hitch is starting to enter the coupler cavity or socket but has not yet unlatched the locking mechanism.
Figure 7:
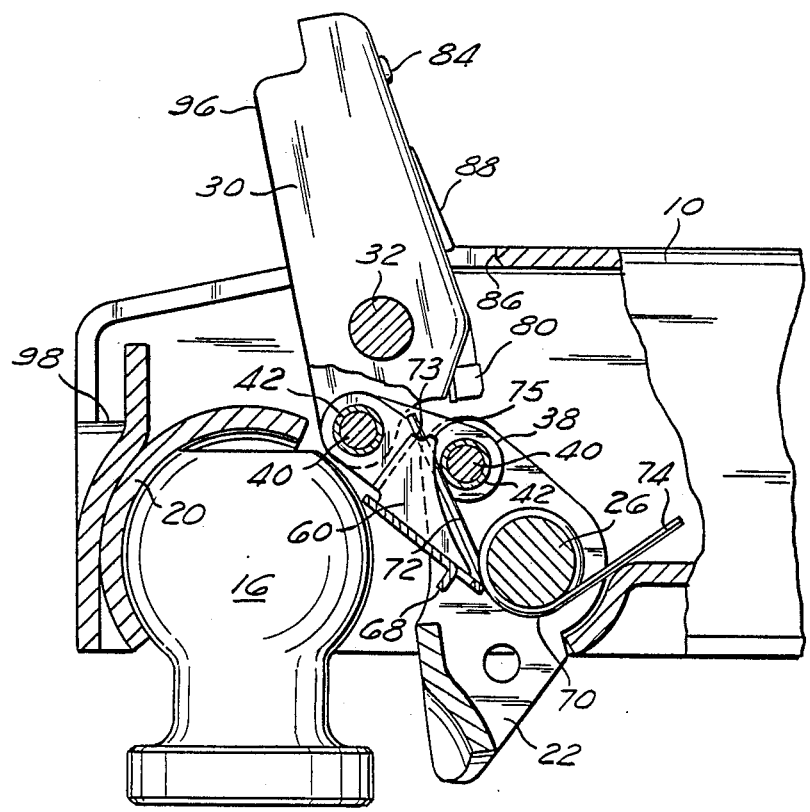
FIG. 7 is like FIG. 6 but the ball is fully inserted into the cavity or socket and has unlatched the locking mechanism.

When a ball 16 is inserted into cavity 24, the sequence shown respectively in FIG. 6 and FIG. 7 occurs. It will be seen in FIG. 6 that ball 16 is starting to enter cavity 24 from below but has not yet displaced abutment 60. Operating handle cannot be pivoted to a closed position because movable ball-gripping member 22 would strike stop 68. This abutment action, thus, prevents bringing operating handle 30 to an indication of a locked position (in the FIG. 6 relative position of parts) when indeed ball 16 is not in position to be secured.

Figure 8:
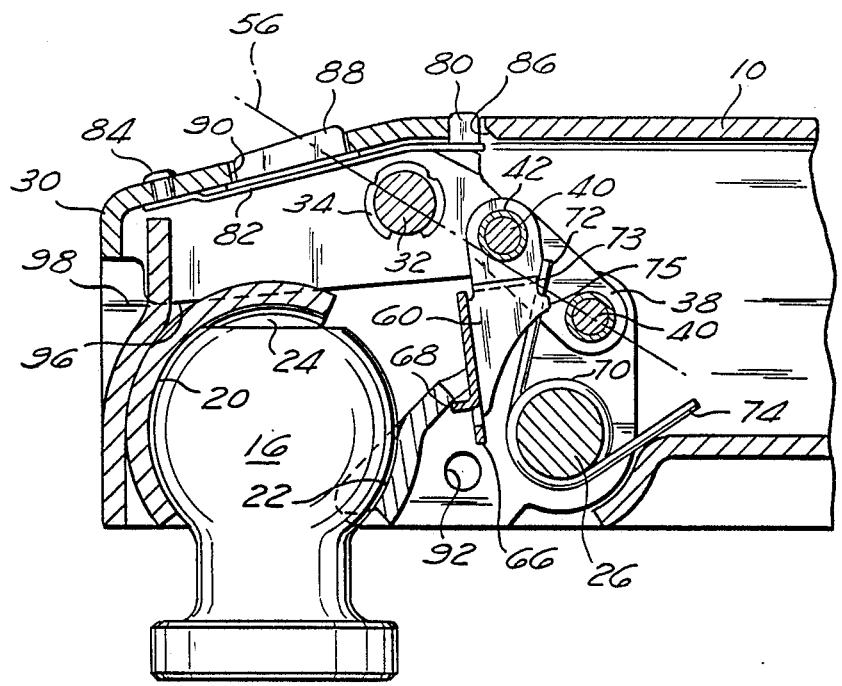
FIG. 8 is like FIG. 7 but the operating handle is now in latched position whereby the ball is locked in the cavity or socket.

It is only when ball 16 is brought fully into cavity 24 as shown in FIG. 7 that ball 16 forces abutment 60 aside, out of the way, so stop 68 will no longer interfere with movable ball-gripping member 22 moving to ball-locking position and so operating handle 30 can be pivoted down to locked position. At that point, the assembly is as shown in FIG. 8 in which ball 16 is securely locked in cavity 24 between ball-gripping members 20, 22 and operating handle 30 is in its down, locked position.

Leg 72 of spring 70 bearing on abutment 60 that is attached to pin 40 extending through openings 46 in handle 30, another effect of spring 70 will be to hold handle 30 upright in its unlocked condition. Further, the same spring force, acting through links 38 to the other pin 40, will tend to hold movable ball-gripping member 22 in open position.

Leg 72 of spring 70 can bear on one of the planar portions 73 of abutment 60 and be retained between the adjacent ear 62 and a lug 75 at the other end of the planar portion 73.

Operating handle 30 is latched in its locked position so that it will not jar loose, such as by the impact of bumps on the road that could possibly overcome the over-center and gravity resistances to unlocking. The latching is by means of a latch piece 80 at the end of a leaf spring 82 secured by a rivet 84. Latch piece 80 normally strikes an adjacent portion 86 of the coupler housing and prevents pivoting of operating handle 30 from locked to unlocked position. A button 88 bears on spring 82 and extends upwardly through an opening 90 in handle 30. When button 88 is manually depressed, as indicated in FIG. 5, latch piece 80 is moved downwardly out of the way of the abutting portion 86 of the housing and then operating handle 30 can be moved to a position unlocking ball 16.

Figure 5:
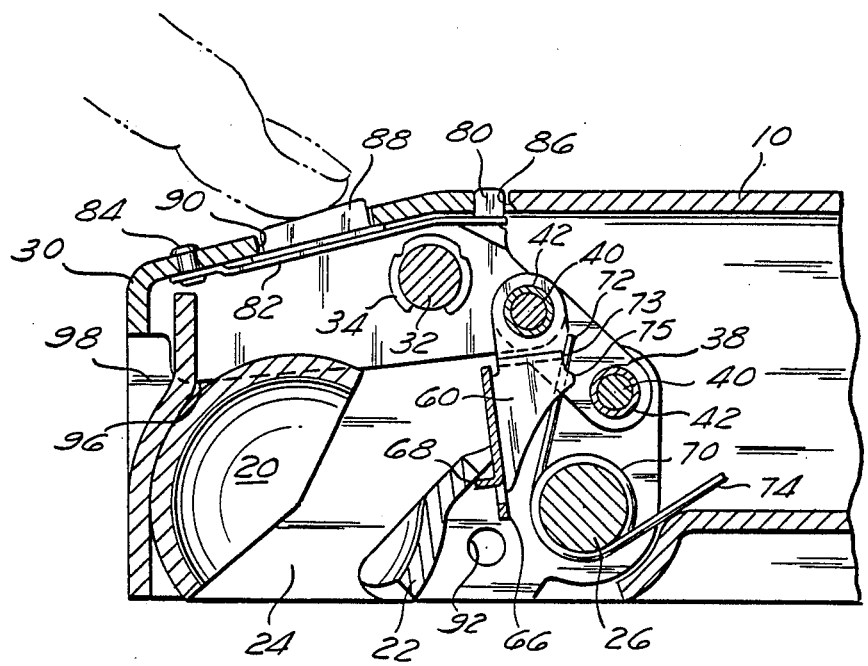
FIG. 5 is a view primarily in section taken on line 5-5 of FIG. 4.

Note that in FIG. 5 the operating handle is in locked position but no ball is in cavity 24. This may occur when it is desired to protect the interior of coupling 10 from the weather in periods of non-use by closing handle 30. The locking is accomplished by manually inserting a finger into cavity 24 to push stop 68 aside so that operating handle 30 can be brought to locked position.

An opening 92 is provided in movable ball-gripping member 22 and an opening 94 is provided in the housing for coupler 10 that align in the locked position of the coupler. These openings will accommodate a padlock so that a trailer 14 can be locked to towing vehicle 18 against theft by locking of coupler 10 to ball 16.

Having thus described my invention, I do not wish to be understood as limiting myself for the exact construction shown and described. Instead, I wish to cover those modifications of my invention that will occur to those skilled in the art upon learning of my invention and which are within the proper scope thereof.

I claim:

1. A trailer coupler to connect to a ball on a hitch of a towing vehicle, comprising:
   (a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member,
   (b) a movable abutment having an operative position in which said abutment is disposed at the edge of said cavity and said abutment is said operative position abutting part of said movable ball-gripping member in said unlocked position of said movable ball-gripping member and preventing movement of said movable ball-gripping member to said locked position, said abutment in said operative position being positioned partly within said cavity so that when a ball moves between said ball-gripping members and seats in said cavity the ball presses against said abutment and moves said abutment to an inoperative position which no longer abuts said part of said movable ball-gripping member and which permits said movable ball-gripping member to be moved to said locked position, a spring normally biasing said abutment to said operative position and normally forcing said movable ball-gripping member to its unlocked position, and
   (c) a pivoted operating handle which can be manually moved between a locked and an unlocked position and a link pivotally connected to said handle and to said movable ball-gripping member, said operating handle being operative when manually pivoted to move said movable ball-gripping member from said unlocked position to said locked position of said movable ball-gripping member only when said abutment has been moved from said operative position to said inoperative position by a ball seating in said cavity.

2. A triler coupler to connect to a ball on a hitch of a towing vehicle, comprising:
   (a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member,
   (b) a movable abutment having an operative position in which said abutment is disposed at the edge of said cavity and is located to abut part of said movable ball-gripping member in said unlocked position of said movable ball-gripping member and preventing movement of said movable ball-gripping member to locked position, said abutment being positioned so that when a ball moves between said ball-gripping members and seats in said cavity the ball presses against said abutment and moves said abutment to an inoperative position and permits said movable ball-gripping member to move to said locked position, a spring normally biasing said abutment to said operative position and normally forcing said movable ball-gripping member to its unlocked position, (c) a pivoted operting handle movable between a locked and an unlocked position and a link pivotally connected to said handle and to said movable ball-gripping member, said operating handle being operable when pivoted to move said movable ball-gripping member from unlocked position to locked position when said abutment has been moved to said inoperative position by a ball seating in said cavity, and (d) said link being toggled overcenter when said handle is moved to its locked position and latch means latching said handle against movement from its locked position to its unlocked position and manually operable means operative to release said latch means so that said handle can be moved from its locked position to its unlocked position.

3. The subject matter of claim 2 in which said coupler includes a housing and said handle is pivotally mounted in said housing to pivot about a horizontal azis and said latch means includes a movable upstanding latch piece mounted in said handle and a spring normally pressing said latch piece into an upper latched position and there being a section of said housing abutting against said latch piece in its latched position to prevent said handle from being pivoted from its locked position to its unlocked position and said latch means being unlatched by manual force causing movement of said latch piece so it can clear said abutting section of said housing and said handle can be moved from it slocked position to its unlocked position.

4. A trailer coupler to connect to a ball on a hitch of a towing vehicle, comprising:

(a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member, (b) a movable abutment having an operative position in which said abutment is disposed at the edge of said cavity and is located to about part of said movable ball-gripping member in said unlocked position of said movable ball-gripping member and preventing movement of said movable ball-gripping member to locked position, said abutment being positioned so that when a ball moves between said ball-gripping members and seats in said cavity the ball presses against said abutment and moves said abutment to an inoperative position and permits said movable ball-gripping member to move to said locked position, a spring normally biasing said abutment to said operative position and normally forcing said movable ball-gripping member to its unlocked position, (c) a pivoted operating handle movable between a locked and an unlocked position and a link pivotally connected to said handle and to said movable ball-gripping member, said operating handle being operable when pivoted to move said movable ball-gripping member from unlocked position to locked position when said abutment has been moved to said inoperative position by a ball seating in said cavity, and (d) said spring being operative to hold said handle in upright position when said handle is unlocked to signal that unlocked condition.

5. A trailer coupler to connect to a ball on a hitch of a towing vehicle, comprising:

(a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member, (b) a movable abutment having an operative position in which said abutment is disposed at the edge of said cavity and said abutment in said operative position abutting part of said movable ball-gripping member in said unlocked position of said movable ball-gripping member and preventing movement of said movable ball-gripping member to said locked position, said abutment in said operative position being positioned at least partly within said cavity so that when a ball moves between said ball-gripping members and seats in said cavity the ball presses against said abutment and moves said abutment to an inoperative position which no longer abuts said part of said movable ball-gripping member and which permits said movable ball-gripping member to be moved to said locked position, a spring normally biasing said abutment to said operative position, and (c) an operating handle connected to said movable ball-gripping member, said operating handle being operable when pivoted to move said movable ball-gripping member from said unlocked position to said locked position of said movable ball-gripping member only when said abutment has been moved from said operative position to said inoperative position by a ball seating in said cavity.

6. A trailer coupler to connect to a ball on a hitch of a towing vehicle, comprising:

(a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in such unlocked position of said movable ball-gripping member, (b) a movable abutment having an operative position in which said abutment is disposed at the edge of said cavity and is located to abut part of said movable ball-gripping members in said unlocked position of said movable ball-gripping member and preventing movement of said movable ball-gripping member to locked position, said abutment being positioned so that when a ball moves between said ball gripping members and seats in said cavity the ball presses against said abutment and moves said abutment to an inoperative position and permits said movable ball-gripping member to move to said locked position, a spring normally biasing said abutment to said operative position, (c) an operating handle connected to said movable ball-gripping member, said operating handle being operable when pivoted to move said movable ball-gripping member from unlocked position to locked position when said abutment has been moved to said inoperative position by a ball seating in said cavity, and (d) latch means latching said handle against movement from its locked position to its unlocked position and manually operable means operative to release said latch means so that said handle can be moved from its locked position to its unlocked position.

7. The subject matter of claim 6 in which said coupler includes a housing and said handle is pivotally mounted in said housing to pivot about a horizontal axis and said latch means includes a movable upstanding latch piece mounted in said handle and a spring normally pressing said latch piece into an upper latched position and there being a section of said housing abutting against said latch piece in its latched position to prevent said handle from being pivoted from its locked position to its unlocked position and said latch means being unlatched by manual force causing movement of said latch piece so it can clear said abutting section of said housing and said handle can be moved from its locked position to its unlocked position.

8. A trailer coupler to connect to a ball on a hitch of a towing vehicle, comprising:

(a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member, (b) a movable abutment having an operative position in which said abutment is disposed at the edge of said cavity and said abutment in said operative position abutting part of said movable ball-gripping member in said unlocked position of said movable ball-gripping member and preventing movement of said movable ball-gripping member to said locked position, said abutment in said operative position being positioned at least partly within said cavity so that when a ball moves between said ball-gripping members and seats in said cavity the ball presses against said abutment and moves said abutment to an inoperative position which no longer abuts said part of said movable ball-gripping member and which permits said movable ball-gripping member to be moved to said locked position, and (c) operating means connected to said movable ball-gripping member, said operating means being operable to move said movable ball-gripping member from said unlocked position to said locked position of said movable ball-gripping member only when said abutment has been moved from said operative position to said inoperative position by a ball seating in said cavity.

9. A trailer coupler to connect to a ball on a hitch of a towing vehicle, comprising:

(a) a stationary ball-gripping member and a movable ball-gripping member movable between an unlocked position and a locked position, said ball-gripping members being oppositely positioned and defining a ball-receiving cavity of a shape to generally fit a ball in locked position of said movable ball-gripping member, said ball-gripping members being disposed to secure a ball therebetween in said cavity against release in said locked position of said movable ball-gripping member, said ball-gripping members being disposed to release a ball from said cavity in said unlocked position of said movable ball-gripping member, (b) a movable abutment having an operative position in which said abutment is operative to prevent movement of said movable ball-gripping member from said unlocked position to said locked position, said abutment in said operative position being positioned at least partly within said cavity so that when a ball moves between said ball-gripping members and seats in said cavity the ball presses against said abutment and moves said abutment to an inoperative position and said abutment in said inoperative position permitting said movable ball-gripping member to be moved to said locked position, and (c) operating means connected to said movable ball-gripping member, said operating means being operable to move said movable ball-gripping member from said unlocked position to said locked position of said movable ball-gripping member only when said abutment has been moved from said operative position to said inoperative position by a ball seating in said cavity.

* * * * *

UNITED STATES PATENT AND TRADEMARK OFFICE
CERTIFICATE OF CORRECTION

PATENT NO. : 4,817,979

DATED : 4/4/89

INVENTOR(S) : Bernhardt P. Goettker

It is certified that error appears in the above—identified patent and that said Letters Patent is hereby corrected as shown below:

Column 4, line 9, "is" should read --in--; and line 37, "triler" should read --trailer--. Column 5, line 29, "it slocked" should read --its locked; and line 48, "about" should read --abut--.

Signed and Sealed this

Seventh Day of November, 1989

*Attest:*

JEFFREY M. SAMUELS

*Attesting Officer*     *Acting Commissioner of Patents and Trademarks*